United States Patent [19]

Kumazawa

[11] Patent Number: 4,620,453
[45] Date of Patent: Nov. 4, 1986

[54] SHIFT CONTROL DEVICE OF VEHICULAR TRANSMISSION

[75] Inventor: Toshiharu Kumazawa, Iwata, Japan

[73] Assignee: Yamaha Hatsudoki Kabushiki Kaisha, Hamamatsu, Japan

[21] Appl. No.: 754,527

[22] Filed: Jul. 12, 1985

[30] Foreign Application Priority Data

Jul. 13, 1984 [JP]  Japan ................... 59-144339

[51] Int. Cl.$^4$ ................... F16H 57/06; G05G 5/10
[52] U.S. Cl. .................... 74/476; 74/337.5; 74/477; 74/538; 74/745; 74/DIG. 7
[58] Field of Search ............ 74/337.5, 476, 477, 74/538, 745, DIG. 7

[56] References Cited

U.S. PATENT DOCUMENTS 4,078,447  3/1978  Kato et al. .................... 74/538 X
4,191,064  3/1980  Houk et al. .................... 74/538 X
4,455,884  6/1984  Tsuruta et al. ................ 74/337.5 X

FOREIGN PATENT DOCUMENTS 59-69552  4/1984  Japan .

Primary Examiner—Allan D. Herrmann
Attorney, Agent, or Firm—Ernest A. Beutler

[57] ABSTRACT

An improved transmission mechanism for an off the road vehicle including a primary and an auxiliary transmission and a shifting interlock for precluding shifting of the auxiliary transmission into reverse when the primary transmission is in high gear. The interlock includes a simple, single straight link.

8 Claims, 6 Drawing Figures

1

SHIFT CONTROL DEVICE OF VEHICULAR TRANSMISSION

BACKGROUND OF THE INVENTION

This invention relates to a shift control device for vehicular transmissions and more particularly to an improved and simplified interlock system between the shifting mechanisms of primary and auxiliary transmissions.

There have been proposed a variety of off the road vehicles having three or four wheels and large, low pressure balloon tires. A large number of these vehicles are designed to accommodate only a single rider and employ as their power unit an engine, transmission assembly of the type commonly associated with motorcycles. Such engine, transmission assemblies include a crankcase which not only contains the crankshaft of the engine but also a primary change speed transmission. Such motorcycle transmissions, however, do not have the wide variety of speed ratios that are desirable for off the road use nor do they accommodate a reverse gear. Therefore, it has been the practice to employ auxiliary transmissions having their input shafts driven by the primary transmission output shaft and which include either plural speed ratios and/or a reversing gear. In this way, it is possible to obtain a very compact power unit consisting of the engine and transmission while providing a great number of speed ratios and also reverse gear.

Where two such transmissions are employed, it is desirable to incorporate an interlock mechanism so that the auxiliary transmission cannot be shifted into reverse when the primary transmission is in a high speed ratio or vice versa. This is advantageous so as to insure that the vehicle will not be operated at too great a speed in reverse.

Like the transmission itself, it is desirable that the interlock by very simple and compact in configuration bearing in mind the overall compact nature of the vehicles with which this type of transmission are employed. However, even though the device must be compact, it should be foolproof in operation and should insure that the device cannot malfunction. The device also should be constructed in such a way that the interlock itself does not interfere with the normal desired shifting pattern of either or both of the primary and auxiliary transmission units. Devices of the type previously proposed have not achieved these results completely.

It is, therefore, a principal object of this invention to provide an improved and simplified interlock relationship between primary and auxiliary transmissions of a vehicle.

It is a further object of this invention to provide a simple, compact and foolproof interlock device for a vehicle transmission.

It is yet a further object of this invention to provide an interlock mechanism for preventing inadvertent shifting of one transmission when the other transmission is in predetermined speed ratios.

SUMMARY OF THE INVENTION

This invention is adapted to be embodied in a shift interlock relationship between a primary transmission and an auxiliary transmission. The primary transmission has an input shaft, an output shaft and first shifting means for controlling the rotational relationship between the input shaft and the output shaft. The first shifting means comprises a first shifting drum that is supported for rotation about a first axis and means responsive to rotation of the first shifting drum for changing the rotational relationship between the input and output shaft. The auxiliary transmission has an input shaft that is driven by the primary transmission output shaft and an output shaft. Second shifting means are provided for controlling the rotational relationship between the input and outputs shafts of the auxiliary transmission and this shifting means comprises a second shifting drum supported for rotation about a second axis and means responsive to rotation of the second shifting drum for changing the rotational relationship between between the input and output shafts of the auxiliary transmission. The interlock comprises a lever that is pivotally connected at one end to one of the shifting drums at a point offset from the axis of rotation of that one drum. Means are provided for restraining the movement of the other end of the lever in a generally reciprocal fashion adjacent to the other of the shifting drums. Cam means on the other shifting drum are provided for precluding rotation of the other drum when the other lever end is in a position corresponding to a certain rotational relationship between the input and output shafts of its associated transmission.

DETAILED DESCRIPTION OF THE PREFERRED EMBODIMENT

Figure 1:
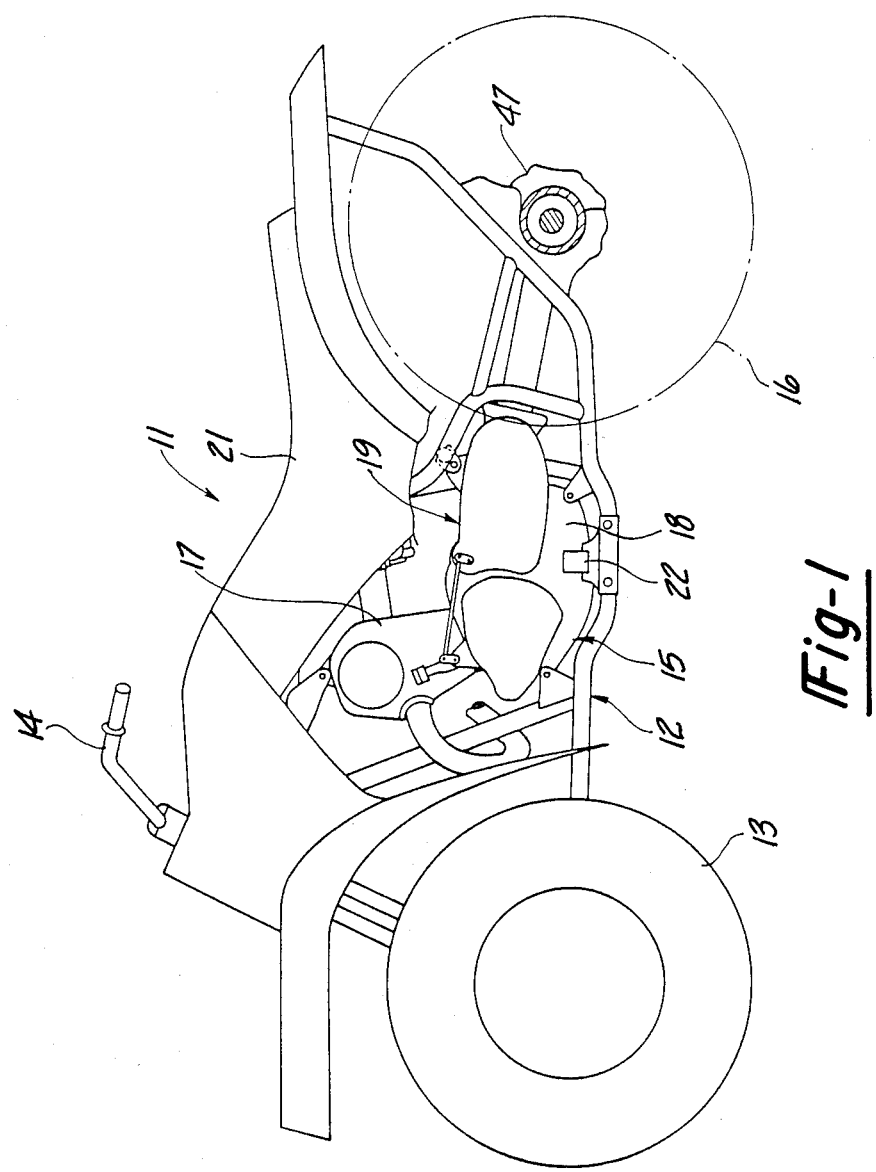
FIG. 1 is a side elevational view of an off the road vehicle constructed in accordance with an embodiment of the invention.

Referring first to FIG. 1, an off the road vehicle constructed in accordance with an embodiment of the invention is identified generally by the reference numeral 11. Although the invention is described in conjunction with an off the road vehicle, it is to be understood that it may be practiced with vehicles of other types.

The vehicle 11 includes a frame assembly 12 having a pair of dirigibly supported front wheels 13 that are controlled by a handlebar 14 in a known manner. A combined engine, transmission assembly, indicated generally by the reference numeral 15 is supported by the frame assembly 12 and drives a pair of rear wheels 16 by means including a transmission assembly, to be described. The engine transmission assembly 15 includes an internal combustion engine 17 which may, as in the illustrated embodiment, be of the single cylinder type. This assemblage 15 also inclucds a combined crankcase, transmission assembly 18 in which the crankshaft of the engine 17 is rotatably journaled and in which a primary transmission, to be described, is contained. An auxiliary transmission casing, indicated generally by the reference numeral 19, is affixed to the side of the crankcase, transmission assembly 18 and contains an auxiliary transmission, also to be described. The auxiliary transmission 19 has its output shaft in driving relationship with the rear wheels 16 in a manner to be described.

The wheels 13 and 14 are adapted to mount balloon low pressure tires of the type that are normally inflated to relatively low pressures such as 0.1 to 0.3 $Kg/cm^2$. As has been noted, however, certain facets of the invention may be employed in connection with other types of vehicles.

A seat 21 is carried by the frame 12 over the engine transmission assembly 15 and is designed so as to accommodate a single rider. A pair of foot pegs 22 are carried by the frame assembly 12 on opposite sides of the engine transmission assembly 15 and beneath the seat 21 so as to accommodate the feet of the rider.

Figure 4:
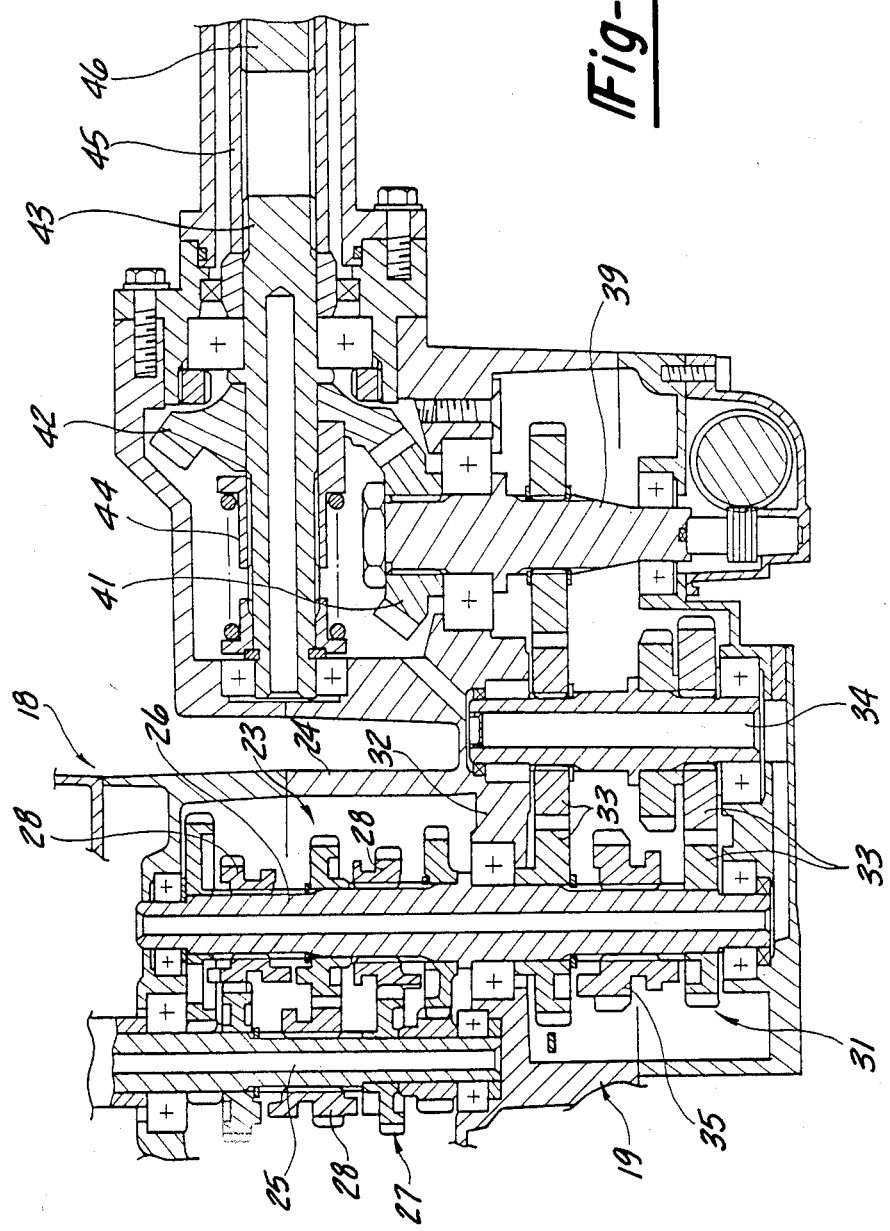
FIG. 4 is a horizontal cross-sectional view showing the transmission mechanism.

Referring now primarily to FIG. 4, the combined crankcase transmission, assembly 18 includes a main or primary change speed transmission, indicated generally by the reference numeral 23, which is contained within a main casing 24 that forms the casing of the crankcase as well as the casing of the primary transmission assembly 23.

The primary transmission assembly 23 includes a primary input shaft 25 that is driven by the output shaft of the engine 17 by means including a clutch (not shown). The shaft 25 rotates about an axis that is disposed transversely to the longitudinal axis of the vehicle 11 as does the crankshaft of the engine 17. A secondary transmission shaft 26 is also journaled within the casing 24 about an axis parallel to the axis of the shaft 25. The shafts 25 and 26 carry a plurality of change speed gear sets 27 and dog clutch assemblies 28 that are suitably shifted so as to permit the operator to select the speed ratio between the rotational speeds of the shafts 25 and 26. This shifting mechanism includes a shifting drum 29 (FIG. 3) that is controlled by the operator in a known manner.

The auxiliary transmission casing 19 includes an auxiliary transmission, indicated generally by the reference numeral 31. The input shaft of the auxiliary transmission 31 comprises an extension of the secondary or output shaft 26 of the primary transmission 23 which passes through an outer wall 32 of the casing 24 and into a cavity defined by the auxiliary transmission casing 19. A plurality of gear sets 33 are journaled on the extension of the shaft 26 and on an idler shaft 34 that is carried by the auxiliary transmission casing 19. In the illustrated embodiment, there are two such ratio sets so as to provide either a low or high speed ratio between the shaft 26 and the shaft 34. A dog clutch assembly 35 is provided for controlling this ratio selection. The operation of the dog clutch assembly 35 will be described in detail below.

A reverse shaft 36 is also contained within the auxiliary transmission casing 19 and carries a reverse gear 37 that is in mesh with gears on the input shaft 26 and idler shaft 34 so as to provide for reverse gear selection so as to reverse the direction of rotation of the shaft 34 relative to the shaft 26. A dog clutching element 38 is carried by the reverse shaft 36 for selectively coupling the gear 37 for rotation with the shaft 36 and achieving the reverse rotation of the shaft 34.

A driven shaft 39 is also provided in the auxiliary transmission 31 and is driven from the idler shaft 34 by one of the gear sets 33. The shaft 39 carries a bevel gear 41 that is enmeshed with a further bevel gear 42 that is journaled on an output shaft 43 that extends perpendicularly to the axes of the shafts 39, 34, 26 and 25. An overload release coupling 44 rotatably couples the bevel gear 42 to the shaft 43 so as to normally establish a driving relationship therebetween. The overload release device 44 can release and permit relative rotation between the gear 42 and the shaft 43 if an obstacle is encountered.

A coupling 45 drivingly connects the output shaft 43 with a drive shaft 46 which, in turn, drives the rear wheels 16 through a final drive assembly 47 in a known manner.

Figure 2:
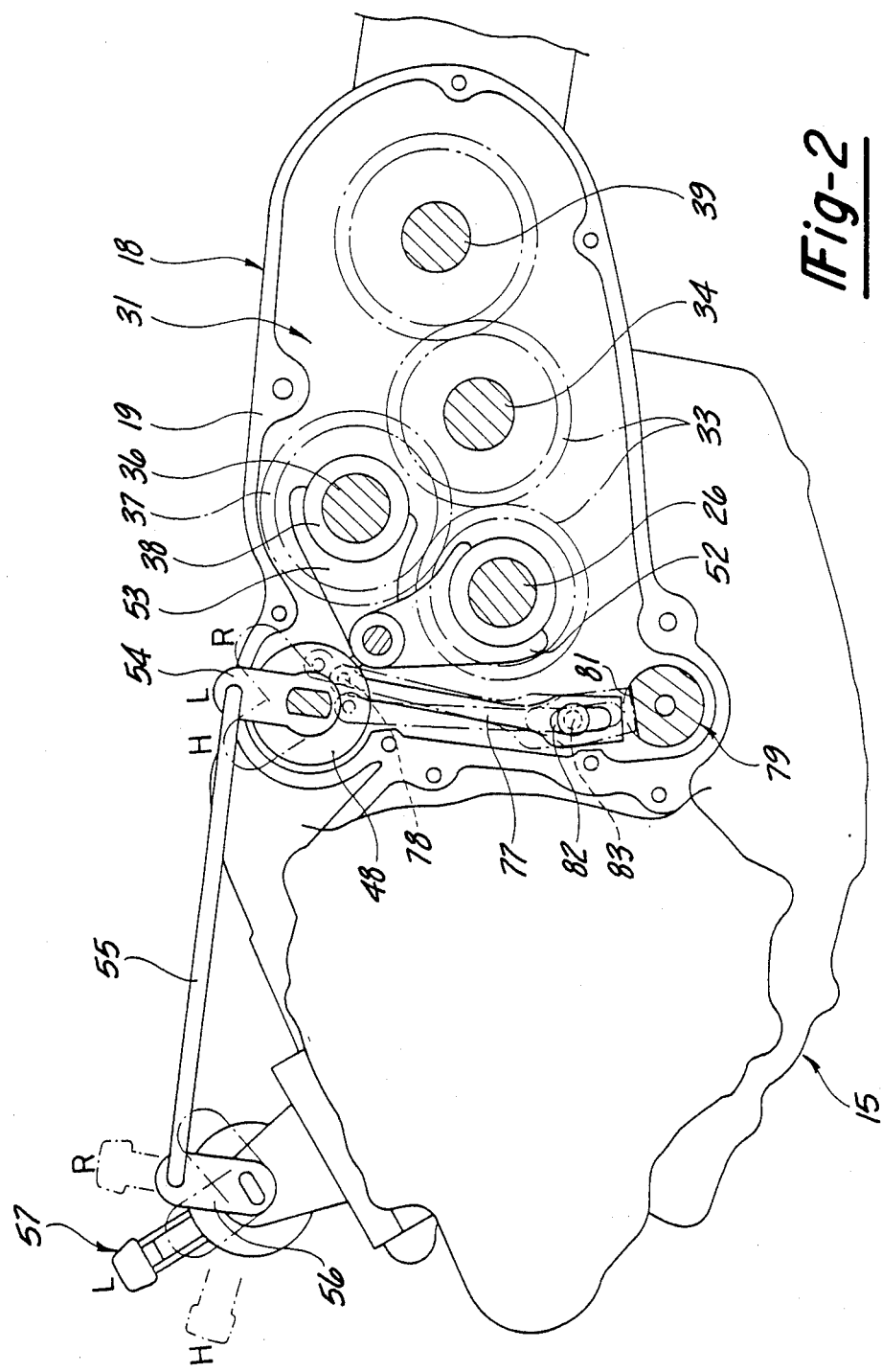
FIG. 2 is an enlarged side elevational view of the transmission mechanism with portions removed.
Figure 3:
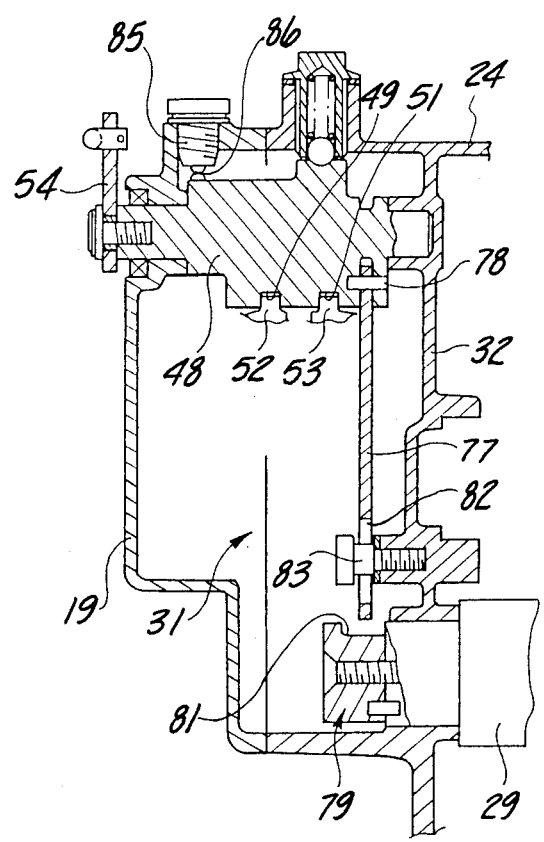
FIG. 3 is a further enlarged cross-sectional view along a plane perpendicular to the plane of FIG. 2 and shows the interlock mechanism.

Shifting of the dog clutches 35 and the dog clutch associated with the reverse gear of the auxiliary transmission 31 is controlled by a mechansim best shown in FIGS. 2 and 3 and which includes a shifting cam 48. The cam 48 has a pair of grooves 49 and 51 that receive tangs 52 and 53, respectively, on shifting forks that actuate these two dog clutches. Rotation of the cam 48 will effect axial movement of the shifting forks and the dog clutches so as to achieve shifting in the desired relationship.

The shifting cam 48 is rotated under the operator's control by means including a lever 54 that is non-rotatably affixed to an exposed end of the shifting cam 48. The lever 54 is, in turn, operated by means of a link 55 that is pivotally connected at one end to the lever 54 and at its other end to a manually controlled lever 56. The manually controlled lever 56 is operated by means of an operator controlled shift lever 57 which has a construction as best shown in FIGS. 5 and 6.

A base assembly 58 is carried by the engine transmission assembly 15 in a convenient place within the reach of the operator. A shaft 59 is journaled by the base assembly 58 and is non-rotatably coupled to the lever 56 and a channeled-shaped portion 61 of the operator controlled shift lever 57. The shift lever 57 has a hand grip portion 62 that can be gripped by the hand of an operator so that it can be rotated. In addition, a detent actuating handle 63 is affixed to a detent member 64 which is slidably supported in the channeled-shaped portion 61 and which is conveniently accessible underneath the hand grip 62. The detent actuating handle 63 is normally urged downwardly by means of a torsional spring 65. The base 58 is formed with a first recess 65, a second recess 66 and a third recess 67. The recesses 65, 66 and 67 are adapted to receive a detent projection 68 of the detent member 64 so as to lock the lever 57 in either the high speed, low speed or reverse positions, respectively.

An upstanding projection 69 separates the recesses 65 and 66 and a somewhat larger upstanding projection 71 separates the recesses 66 and 67. A reverse lockout pin 72 is slidably carried by the hand grip portion 62 of the operator shift lever 57 so as to prevent the shifting into reverse unless the lockout pin 72 is released. A coil compression spring 73 acts against the lockout pin 72 so as to urge it to an outer position to the left as seen in FIG. 5. In this position, the lower face of the lockout pin 72 will be engaged by a projection 74 of the detent mechanism 64 so as to prevent the detent mechanism 64 from being drawn up sufficient so that the detent end 68 will clear the projection 71. A recess 75 is positioned forwardly of this section so as to permit release when the reverse lockout pin 72 is pushed inwardly.

Figure 5:
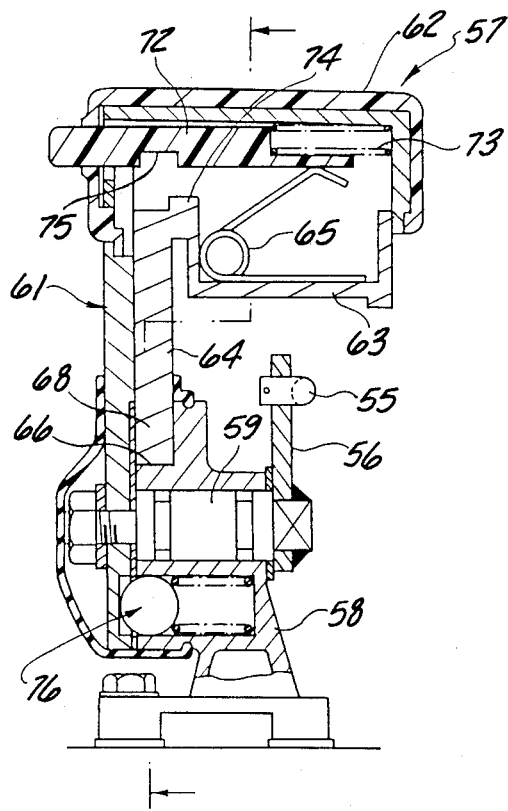
FIG. 5 is an enlarged cross-sectional view showing the shifting mechanism of the auxiliary transmission.
Figure 6:
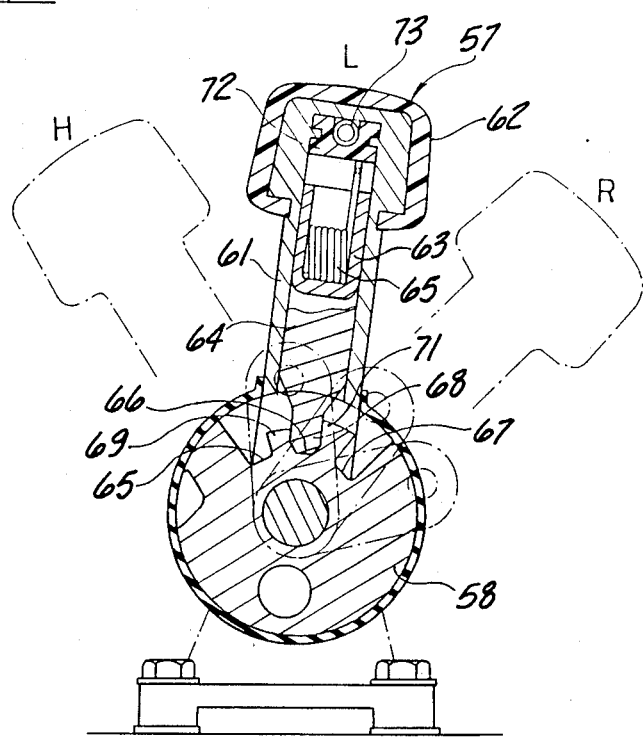
FIG. 6 is a cross-sectional view of the shifting mechanism taken along the line 6—6 of FIG. 5.

FIGS. 5 and 6 show the shifting mechanism when the auxiliary transmission is in its low speed range. If it is desired to shift into the high speed range, the hand grip portion 62 is grasped and the detent operating handle 63 is pulled upwardly compressing the spring 65 and permitting the detent pin 68 to move upwardly sufficient so as to pass the projection 66. The handle 57 may then be shifted to the left or in a counterclockwise direction as shown in FIG. 6 until the detent engages the recess 65 at which time it may be released.

To shift into reverse from the position shown in FIGS. 5 and 6, it is necessary for the operator to push the reverse lockout pin 72 inwardly so that the recess 75 will align with the projection 74 of the detent 64. Then, the detent operator handle 63 may be pulled upwardly sufficiently so that the detent pin 68 will clear the projecton 71 and the shift lever may be moved in a clockwise direction until the detent engages with the recess 67 at which time the device will be locked in reverse.

A detent mechanism, indicated generally by the reference numeral 76, is carried by the base 58 and cooperates with the lever 61 for retaining it in its respective positions so as to further assist the operation.

Referring now again to FIGS. 2 and 3, the interlocking relationship between the selectors of the primary and auxiliary transmissions 23 and 31 will now be described. This interlocking mechanism is designed so as to prevent the shifting of the auxiliary transmission 31 into reverse if the primary transmission 23 is in a high gear and also which will prevent shifting of the primary transmission 23 into a high gear when the auxiliary transmission 31 is in reverse.

The lockout mechanism includes a generally straight lockout link 77 that is pivotally connected at one end by means of a pivot pin 78 to the auxiliary transmission shifting drum 48. This pivotal connection is eccentrically disposed to the rotational axis of the drum 48. The opposite end of the link 77 is juxtaposed to one end of the shifting drum 29 of the primary transmission. A cam plate 79 is affixed to the drum 29 and has a locking recess 81. The lockout lever 77 is formed with an elongated slot 82 adjacent the cam 79 and in which a pin 83 is received. The pin 83 cooperates with the slot 82 so as to cause the lower end of the lockout lever 77 to move in a reciprocatory motion when the shifting drum 48 is rotated. As may be seen from the various phantom line views shown in FIG. 1, when the shifting drum 48 is in either the low or high speed relationship, the lower end of the lockout lever 77 will be clear of the recess 81 so that the shifting drum 29 of the primary transmission may be rotated to any of the desired speed ratios. However, when the shifting drum 48 is in the reverse condition, the end of the lever 77 will mate in the groove 81 and prevent rotation of the drum 29. However, the drum 29 must be positioned in other than its high speed position before the recess 81 is presented to receive the end of the lockout lever 77. If the drum is not in this location, it will be impossible to shift the auxiliary transmission into reverse, as is believed to be readily apparent. Thus, the lockout mechanism is effective to prevent shifting of the drum 29 and the primary transmission assembly 23 into a high gear when the auxiliary transmission 31 is in its reverse condition and to prevent shifting of the auxiliary transmission 31 into reverse when the primary transmission 23 is in high gear.

In order to provide a further safety factor, a reverse gear detecting switch 85 is carried by the auxiliary transmission casing 19 and is juxtaposed to the cam 48. A projection 86 on the cam 48 contacts the switch 85 when the cam 48 is in a position to have selected reverse gear and a light (not shown) carried on the handlebar assembly 14 will be illuminated to indicate to the operator that reverse gear has been selected.

It should be readily apparent that the described construction is very effective in preventing the inadvertent selection of reverse gear when the primary transmission is in high gear or, alternatively, for preventing selection of high gear in the primary transmission when operating in reverse. The construction is quite simple and yet effective and does not interfere with the normal shifting of either the primary or the auxiliary transmissions nor does it add to their bulk. Although an embodiment of the invention has been illustrated and described, various changes and modifications may be made without departing from the spirit and scope of the invention, as defined by the appended claims.

I claim:

1. A shift interlock between a primary transmission having an input shaft, an output shaft and first shifting means for controlling the rotational relationship between said input shaft and said output shaft, said first shifting means comprising a first shifting drum supported for rotation about a first axis and means responsive to the rotation of said first shifting drum for changing the rotational relationship between said input shaft and said output shaft, an auxiliary transmission having an input shaft driven by said primary transmission output shaft and an output shaft and second shifting means for controlling the rotational relationship between said input shaft and said output shaft of said auxiliary transmission, said second shifting means comprising a second shifting drum supported for rotation about a second axis and means responsive to the rotation of said second shifting drum for changing the rotational relationship between said input shaft and said output shaft of said auxiliary transmission, said interlock comprising a link pivotally connected at one end to one of said shifting drums at a position offset from the rotational axis of said one shifting drum, means for retaining the movement of the other end of said link in a generally reciprocating fashion adjacent the other of said shifting drums, and cam means on said other shifting drum for precluding rotation of said other shifting drum when said link end is in a position for establishing a certain rotational relationship between the input and output shafts of its associated transmission.

2. A shift interlock as set forth in claim 1 wherein the means for restraining the movement of the other end of the link comprises a slot in the link and a pin received in the slot for constraining the movement of the other end.

3. A shift interlock as set forth in claim 2 wherein the cam means comprises a rotary cam affixed with the other shifting drum and having a notch adapted to receive the other lever end when the associated transmission is in the certain rotational relationship.

4. A shift interlock as set forth in claim 1 wherein the one end of the link is pivotally connected to the shifting drum associated with the primary transmission and is operative to prevent shifting of the auxiliary transmission into reverse when the primary transmission is in high gear.

5. A shift interlock as set forth in claim 4 wherein the means for restraining the movement of the other end of the link comprises a slot in the link and a pin received in the slot for constraining the movement of the other end.

6. A shift interlock as set forth in claim 5 wherein the cam means comprises a rotary cam affixed with the other shifting drum and having a notch adapted to receive the other lever end when the associated transmission is in the certain rotational relationship.

7. A shift interlock as set forth in claim 6 further including an operator controlled lever for controlling the shifting of the auxiliary transmission into reverse and into another driving relationship and reverse lockout means for preventing movement of said operator controlled lever to reverse unless said reverse lockout means is released.

8. A shift interlock as set forth in claim 6 further including means providing a warning signal to the operator when the auxiliary transmission is shifted into reverse.

* * * * *